US009547633B2

(12) United States Patent
Scoda (10) Patent No.: US 9,547,633 B2
(45) Date of Patent: Jan. 17, 2017

(54) METHODS FOR EXTENDING A SELECTOR APPLICATION PROGRAMMING INTERFACE AND DEVICES THEREOF

(71) Applicant: Usablenet Inc., New York, NY (US)

(72) Inventor: Enrico Scoda, Martignacco (IT)

(73) Assignee: UsableNet Inc., New York, NY (US)

( * ) Notice: Subject to any disclaimer, the term of this patent is extended or adjusted under 35 U.S.C. 154(b) by 317 days.

(21) Appl. No.: 14/070,764

(22) Filed: Nov. 4, 2013

(65) Prior Publication Data
US 2015/0128028 A1    May 7, 2015

(51) Int. Cl.
G06F 17/00 (2006.01)
G06F 17/22 (2006.01)
G06F 17/30 (2006.01)
G06F 17/21 (2006.01)

(52) U.S. Cl.
CPC ........ G06F 17/2247 (2013.01); G06F 17/218 (2013.01); G06F 17/2264 (2013.01); G06F 17/30896 (2013.01); G06F 17/30908 (2013.01)

(58) Field of Classification Search
CPC .............. G06F 17/218; G06F 17/2264; G06F 17/30896; G06F 17/30908
See application file for complete search history.

(56) References Cited

U.S. PATENT DOCUMENTS

| 2005/0262063 A1* | 11/2005 | Conboy | ............ | G06F 17/30864 |
| 2011/0307238 A1 | 12/2011 | Scoda | | |
| 2012/0084636 A1* | 4/2012 | Sengamedu | ........ | G06F 17/2247 715/234 |

OTHER PUBLICATIONS

"css2xpath#", dated Jun. 6, 2012, pp. 1-5, URL:<https://bitbucket.org/MostThingsWeb/css2xpath/src/8ebd3e3b6d3bdc4b9b752b06ca7470daa9ca217d/css2xpath/css2xpath.cs?at=master&fileviewer=file-view-default>.*
"XML Path Language (XPath) 2.0", dated Apr. 4, 2005, pp. 1-124, URL:<http://www.w3.orgfTR/2005/WD-xpath20-20050404/>.*
"How to map C S S selectors to XPath queries", dated Sep. 24, 2006, pp. 1-2, URL:<http://plasmasturm.org/log/444/>.*
"cssselect: CSS Selectors for Python", dated Oct. 17, 2013, pp. 1-9, URL:<https://pythonhosted.org/cssselect/#id11>.*
Laplante Chris, "css2xpath reloaded", dated Oct. 27, 2013, pp. 1-14, URL:<https://bitbucket.org/MostThingsWeb/css2xpath-reloaded/commits/feea6b2cf7ad146a82a44cd8de326294014e6aba?at=master>.*
"CSS selector to Xpath conversion", dated Mar. 18, 2012, pp. 1-4, URL:<https://hakre.wordpress.com/2012/03/18css-selector-to-xpath-conversion/>.*
"Xpath/CSS Equivalents", dated Mar. 12, 2013, pp. 1-11, URL:<https://en.wikibooks.org/w/index.php?title=XPath/CSS_Equivalents&oldid=2500822>.*

(Continued)

*Primary Examiner* — Mustafa Amin
(74) *Attorney, Agent, or Firm* — LeClairRyan, a Professional Corporation (57) ABSTRACT

A method, non-transitory computer readable medium, and web content management server device that receives a cascading style sheet (CSS) selector expression comprising a plurality of expression components. Whether an equivalent XML path language (XPath) expression can be generated for each of the expression components is determined. Each of the expression components for which an equivalent XPath expression cannot be generated is transformed into a transformed expression comprising at least one XPath expression and an extension function.

27 Claims, 7 Drawing Sheets

(56) References Cited

OTHER PUBLICATIONS

Bjoern Hoehrmann, "CSS selectors to XPath expressions", pp. 1-5, dated Sep. 27, 2007, URL:<https://lists.w3.org/Archives/Public/wwwarchive/ 2007Sep/0113.html>.*
Mesbah, A., et al., "Automated Analysis of CSS Rules to Support System Maintenance", Software Engineering (ICSE), 34th IEEE International Conference on Jun. 2, 2012, pp. 408-418 (Jun. 2, 2012).
W3c, "XSL Transformations (XSLT) Version 2.0—W3C Working Draft Apr. 4, 2005", retrieved from the Internet URL: http://www.w3c.org/TR/2005/WD-xslt20-20050404/ on May 25, 2012, pp. 1-180, (Apr. 4, 2005).
Zeller, W. P., et al., "SVC: Selector-Based View Composition for Web Frameworks", Usenix pp. 1-12 (May 19, 2010).
European Search Report for European Patent Application No. 14191628.8, (Mar. 24, 2015).

* cited by examiner

METHODS FOR EXTENDING A SELECTOR APPLICATION PROGRAMMING INTERFACE AND DEVICES THEREOF

FIELD

This technology generally relates to methods and devices for optimizing delivery of web content and, more particularly, to methods for extending a selectors application programming interface (API) and devices thereof.

BACKGROUND

A web content management server is a server that optimizes web pages and web page interactions for client devices with special requirements, such as smartphones. By way of example, a client device can send an HTTP request for a web page which is retrieved from a server device by the web content management server. Next, the web content management server can optimize the content of the web page by applying transformation rules tailored to the requesting client device. This optimization process can include extracting content relevant to the requesting client device and adapting the extracted content to fit the specifications of the requesting client device. In order to adapt the content, the web content management server can perform transformations including JavaScript removal, content linearization, and small screen adaptation, for example.

Although this process works well to optimize content for display at the requesting client device, the web page may not function properly when the original content heavily depends on JavaScript technology that cannot be implemented on some client devices. For example, if the requested web page includes JavaScript code responsible for populating form fields, validating form submissions, retrieving data from external resources (e.g., based on AJAX technology), and even generating components that may change the structure of the web page, the page at the client device will not be able to properly function.

Accordingly, JavaScript included in web pages can be removed, stored by the web content management server, and replaced by a hidden field with an identifier, for example. The identifier is subsequently sent by the client device in an HTTP request in response to a web page interaction requiring execution of the JavaScript, such as a request for validation of login credentials. Based on the identifier, the web content management server can retrieve the JavaScript, execute the JavaScript in an emulated JavaScript environment on behalf of the client device, and return a result to the client device.

In some implementations, the emulated JavaScript environment can support application programming interfaces (APIs) such as those defined by hypertext markup language (HTML), events, cascading style sheet (CSS), range, traversal, and views models, for example. Some of the supported APIs can allow web page developers to embed JavaScript defining functionality for accessing a document object model (DOM) associated with a web page in order to perform an operation. For example, the selector API provides CSS selector expressions or queries configured to be applied to a DOM to obtain a result set of elements of the DOM.

However, CSS selector expressions can be difficult to implement, can be complex, and can require specific code or libraries to be implemented. While some CSS selector expressions can be translated into XML path language (XPath) expressions or queries, which are relatively efficient to execute, many CSS selector expressions are not translatable.

SUMMARY

A method for extending a selector application programming interface (API) includes receiving, with a web content management server, a cascading style sheet (CSS) selector expression comprising a plurality of expression components. Whether an equivalent XML path language (XPath) expression can be generated for each of the expression components is determined with the web content management server. Each of the expression components for which an equivalent XPath expression cannot be generated is transformed with the web content management server into a transformed expression comprising at least one XPath expression and an extension function.

A non-transitory computer readable medium having stored thereon instructions for extending the selector API comprising machine executable code which when executed by a processor, causes the processor to perform steps including receiving a cascading style sheet (CSS) selector expression comprising a plurality of expression components. Whether an equivalent XML path language (XPath) expression can be generated for each of the expression components is determined. Each of the expression components for which an equivalent XPath expression cannot be generated is transformed into a transformed expression comprising at least one XPath expression and an extension function.

A web content management server device includes a processor coupled to a memory and configured to execute programmed instructions stored in the memory including receiving a cascading style sheet (CSS) selector expression comprising a plurality of expression components. Whether an equivalent XML path language (XPath) expression can be generated for each of the expression components is determined. Each of the expression components for which an equivalent XPath expression cannot be generated is transformed into a transformed expression comprising at least one XPath expression and an extension function.

This technology provides a number of advantages including methods, non-transitory computer readable medium, and devices that facilitate more efficient processing of CSS selector expressions using XPath. With this technology, CSS selector expressions are fully translatable into XPath expressions which can be evaluated in an emulated JavaScript environment by a relatively efficient XPath processor without requiring the specific code otherwise necessary to execute the CSS selector expressions.

DETAILED DESCRIPTION

Figure 1:
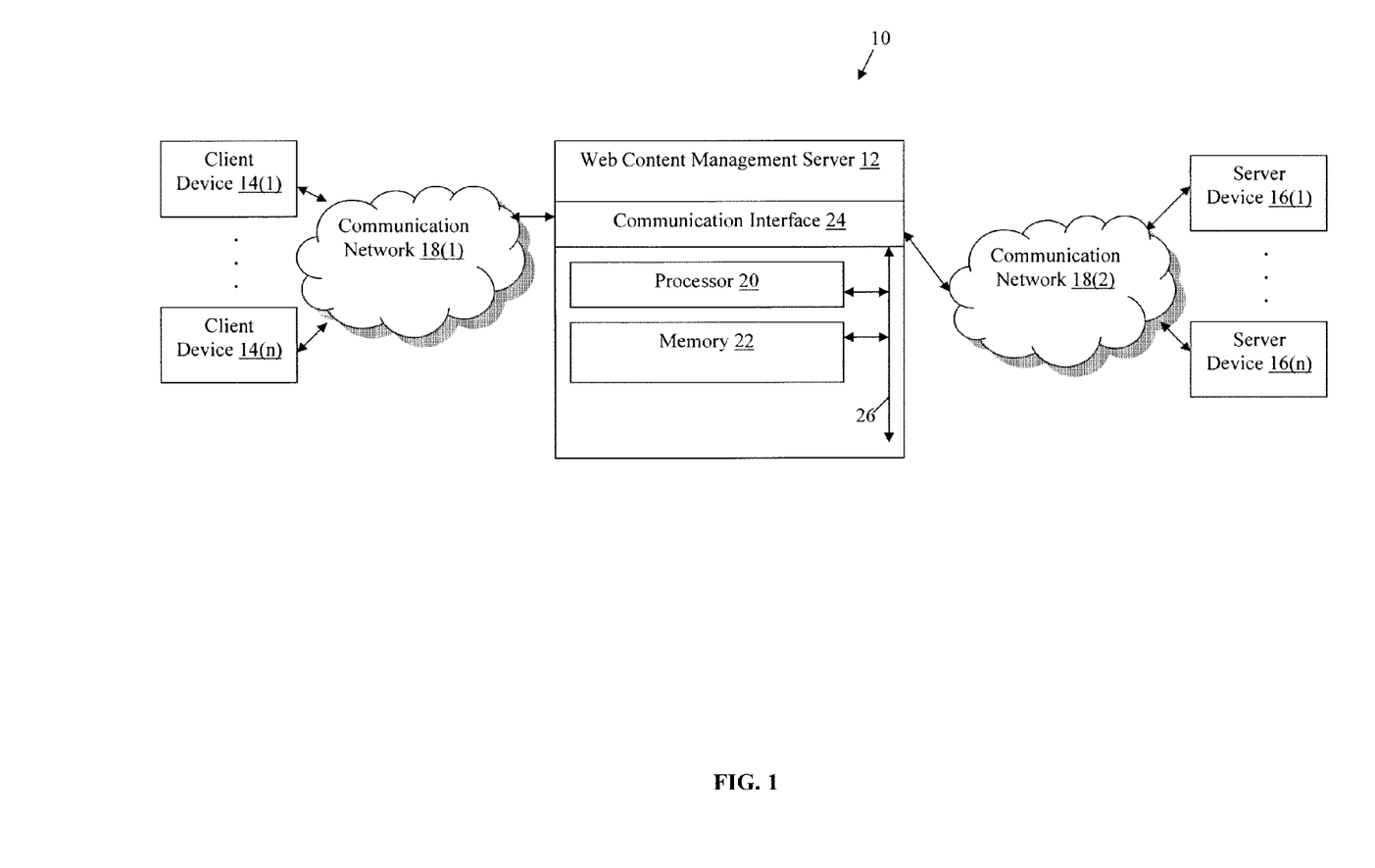
FIG. 1 is a block diagram of a network environment with an exemplary web content management server.

An exemplary network environment 10 with a web content management server 12 coupled to client devices 14(1)-14(n) and server devices 16(1)-16(n) is illustrated in FIG. 1. In this example, the web content management server 12, client devices 14(1)-14(n), and server devices 16(1)-16(n) are coupled together by communication networks 18(1)-18(2), although other numbers and types of systems, devices, and/or elements in other configurations or network topologies can also be used. This technology provides a number of advantages including methods, non-transitory computer readable medium, and devices that facilitate more efficient processing of CSS selector expressions in an emulated JavaScript environment.

The web content management server 12 is coupled to the client devices 14(1)-14(n) by the communication network 18(1), which can include one or more local area network(s) (LANs) and/or wide area network(s) (WANs). In this example, the web content management server 12 is further coupled to the server devices 16(1)-16(n) by the communication network 18(2), which may also include one or more LANs and/or WANs. Other network devices configured to generate, send, and receive network communications and coupled together via other topologies can also be used. While not shown, the network environment 10 also may include additional network components, such as routers, switches and other devices, which are well known to those of ordinary skill in the art and thus will not be described here.

The web content management server 12 may perform any number of functions including optimizing content retrieved from the server devices 16(1)-16(n) for display on the client devices 14(1)-14(n), for example. In this example the web content management server 12 includes a processor 20, a memory 22, and a communication interface 24, which are coupled together by a bus 26 or other link, although other numbers and types of components, parts, devices, systems, and elements in other configurations and locations can be used.

The processor 20 in the web content management server 12 executes a program of stored instructions one or more aspects of the present invention, as described and illustrated by way of the embodiments herein, although the processor 20 could execute other numbers and types of programmed instructions. The processor 20 of the web content management server 12 may comprise one or more central processing units or general purpose processors with one or more processing cores, for example.

The memory 22 in the web content management server 12 stores these programmed instructions for one or more aspects of the present invention, as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 20, can be used for the memory 22 in the web content management server 12.

The communication interface 24 in the web content management server 12 is used to operatively couple and communicate between the web content management server 12, client devices 14(1)-14(n), and server devices 16(1)-16(n), which are all coupled together via the communication networks 18(1)-18(2), although other types and numbers of communication networks or systems with other types and numbers of connections and configurations to other devices and elements can also be used. By way of example only, the communication networks 18(1)-18(2) can use TCP/IP over Ethernet and industry-standard protocols, including hypertext transfer protocol (HTTP), secure HTTP (HTTPS), wireless application protocol (WAP), and/or SOAP, although other types and numbers of communication networks, such as a direct connection, modems and phone lines, e-mail, and wireless and hardwire communication technology, each having their own communications protocols, can be used.

The client devices 14(1)-12(n) enable a user to request, receive, and interact with applications, web services, and content hosted by the server devices 16(1)-16(n) through the web content management server 12 and using the communication network 18(1), although one or more of the client devices 14(1)-14(n) could access content and utilize other types and numbers of applications from other sources and could provide a wide variety of other functions for the user. In some examples, the client devices 14(1)-14(n) comprise mobile devices with Internet access that enable web pages and other content stored by the server devices 16(1)-16(n) to be retrieved and rendered. By way of example only, the client devices 14(1)-14(n) can be smart phones, personal digital assistants, tablets, or computers.

Each of the client devices 14(1)-14(n) includes a processor, a memory, an input device, a display device, and a communication interface, which are coupled together by a bus or other link, although one or more of client devices 14(1)-14(n) can include other numbers and types of components, parts, devices, systems, and elements in other configurations. The processor in each of the client devices 14(1)-14(n) can execute a program of instructions stored in the memory the client device 14(1)-14(n) for one or more aspects of the present invention, as described and illustrated herein, although the processor could execute other numbers and types of programmed instructions.

The input device in each of the client devices 14(1)-14(n) can be used to input selections, such as a request for a particular web page or other content stored by one or more of the server devices 16(1)-16(n), although the input device could be used to input other types of requests and data and interact with other elements. The input device can include keypads, touch screens, and/or vocal input processing systems, although other types and numbers of input devices can also be used.

The display device in each of the client devices 14(1)-14(n) can be used to show data and information to the user, such as web pages and other content retrieved from the server devices 16(1)-16(n) by way of example only. The display device in each of the client devices 14(1)-14(n) can be a mobile phone screen display, although other types and numbers of displays could be used depending on the particular type of client device.

The communication interface in each of the client devices 14(1)-14(n) can be used to operatively couple and communicate between the client devices 14(1)-14(n), web content management server 12, and server devices 16(1)-16(n) over the communication networks 18(1)-18(2).

Each of the server devices 16(1)-16(n) provides content including web pages and web applications for use by one or more of the client devices 14(1)-14(n) via the web content management server 12, although the server devices 16(1)-16(n) can provide other numbers and types of content and perform other functions. Each of the server devices 16(1)-16(n) can include a processor, a memory, and a communication interface, which are coupled together by a bus or other link, although each of the server devices 16(1)-16(n) can have other numbers and types of components, parts, devices, systems, and elements in other configurations.

The processor in each of the server devices 16(1)-16(n) executes a program of instructions stored in the memory of the server devices 16(1)-16(n) for one or more aspects of the present invention, as described and illustrated by way of the embodiments herein, although the processor could execute other numbers and types of programmed instructions.

The communication interface in each of the server devices 16(1)-16(n) is used to operatively couple and communicate between the server devices 16(1)-16(n), the web content management server 12, and the client devices 14(1)-14(n) via the communication networks 18(1)-18(2).

Although embodiments web content management server 12, the client devices 14(1)-14(n), and the server devices 16(1)-16(n) are described and illustrated herein, each of the web content management server 12, the client devices 14(1)-14(n), and the server devices 16(1)-16(n) can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s).

Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

In addition, two or more computing apparatuses or devices can be substituted for any one of the devices in any embodiment described herein. Accordingly, principles and advantages of distributed processing, such as redundancy and replication also can be implemented, as desired, to increase the robustness and performance of the devices of the embodiments. The embodiments may also be implemented on computer apparatuses or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as one or more non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
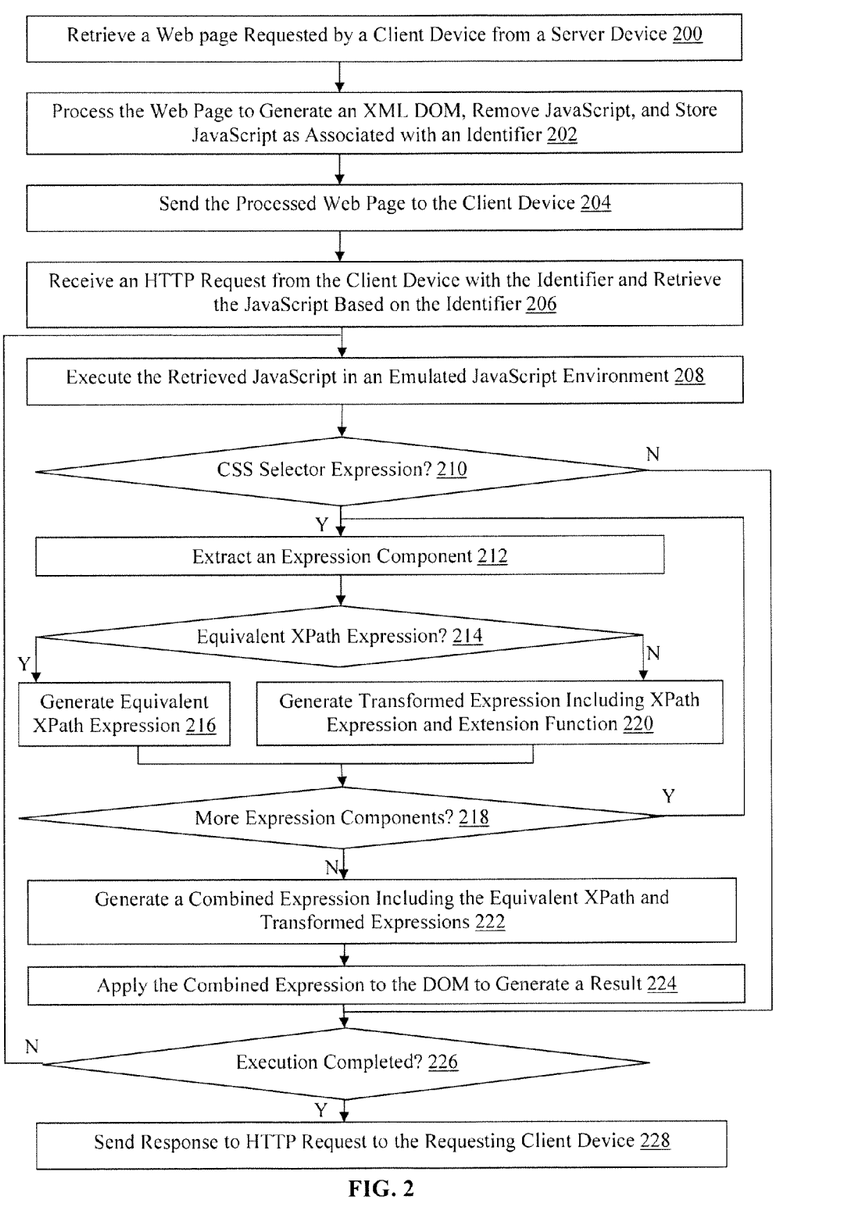
FIG. 2 is a flow chart of an exemplary method for extending the selector API to an emulated JavaScript environment.

An exemplary method for extending a selector application programming interface (API) will now be described with reference to FIGS. 1-7. Referring more specifically to FIG. 2, a flow chart of an exemplary method for extending the selector API to an emulated JavaScript environment is illustrated. In this example, in step 200, the web content management server 12 receives an HTTP request for a web page from one of the client devices 14(1)-14(n) and retrieves the requested web page from one of the server devices 16(1)-16(n).

In step 202, the web content management server 12 processes the retrieved web page to generate an XML document object model (DOM) and to remove one or more JavaScript code portions. In this example, the web content management server 12 stores the DOM and each of the removed JavaScript portions in the memory 22. Each of the removed JavaScript portions can be stored as associated with a respective identifier.

Additionally, the web page can be modified by the web content management server 12 to insert hidden fields in place of the removed JavaScript. Each of the hidden fields include at least one of the identifiers and are inserted so as to cause the requesting one of the client devices 14(1)-14(n) to send one or more of the identifiers in a subsequent HTTP request. Optionally, the web page can be further processed to optimize the web page for a display on the requesting one of the client devices 14(1)-14(n) and/or to improve the transmission and/or load time of the web page, for example, although any other type of processing can also be performed on the web page.

In step 204, the web content management server 12 sends the processed web page to the requesting one of the client devices 14(1)-14(n). Once received, the requesting one of the client devices 14(1)-14(n) can load the web page in a web browser for example.

In step 206, the web content management server 12 receives an HTTP request which includes the identifier from the requesting one of the client devices 14(1)-14(n) in response to a user interaction with the web page. For example, the user may submit login credentials using a submit button which prompts the requesting one of the client devices 14(1)-14(n) to generate and send an HTTP request including one of the identifiers previously included in a tag associated with the submit button in step 202. In response to receiving the HTTP request, the web content management server 12 retrieves the JavaScript code corresponding to the identifier included in the request from the memory 22.

In step 208, the web content management server 12 executes the retrieved JavaScript code on behalf of the requesting one of the client devices 14(1)-14(n) in an emulated JavaScript environment. The emulated JavaScript environment essentially emulates the web browser environment of the requesting one of the client devices 14(1)-14(n). Methods and devices for utilizing an emulated JavaScript environment are described in U.S. patent application Ser. No. 12/802,670 entitled "Methods for utilizing a javascript emulator in a web content proxy server and devices thereof," which is incorporated herein by reference in its entirety.

During execution of the JavaScript code, the web content management server 12 determines, in step 210, whether a cascading stylesheet (CSS) selector expression is encountered. CSS selector expressions include a querySelector( ) or querySelectorAll( ) function call in this example and a plurality of expression components, although the CSS selector expressions could include other function calls and other content. Each of the querySelector( ) and querySelectorAll( ) functions are defined in the selector API and receive at least one CSS selector as a parameter. If the web content management server 12 determines that a CSS selector expression has been encountered, then the Yes branch is taken to step 212.

While steps 200-212 are illustrated for exemplary purposes, other methods of encountering or receiving a CSS selector expression can be used. Additionally, other types of environments other than an emulated JavaScript environment can be used. For example, the methods and devices described and illustrated herein are operable with any browser emulator executed on a web content management server in which the DOM for each retrieved web page is implemented using an XML DOM implementation paired with an XPath processor.

In step 212, the web content management server 12 extracts an expression component from the CSS selector expression, and more particularly, from the CSS selector(s) included as parameters in the CSS selector expression. One exemplary expression component can be "div.red" (e.g., as part of a CSS selector expression "querySelectorAll('div.red')"). This expression component would require selecting all the "div" elements of the DOM generated in step 202 having a class attribute containing "red". Other expression components can also be extracted in step 212.

In step 214, the web content management server 12 determines whether an equivalent XML path language (XPath) expression can be generated for the extracted expression component. The determination can be made based on a stored mapping of expression component formats or types to equivalent XPath expressions, for example, although other methods of determining whether the expression component has an equivalent XPath expression can also be used. In this example, the "div.red" expression component is equivalent to the "//div[contains(concat(", @class, "), 'red')]" XPath expression. Accordingly, if the web content management server 12 determines that an equivalent XPath expression can be generated for the expression component, then the Yes branch is taken to step 216.

In step 216, the web content management server 12 generates the equivalent XPath expression from the expression component. Optionally, the web content management server 12 also stores the equivalent XPath expression at least temporarily in the memory 22.

In step 218, the web content management server 12 determines whether there are more expression components that can be extracted from the CSS selector expression. If the web content management server 12 determines there are more expression components that can be extracted from the CSS selector expression, then the Yes branch is taken back to step 212 and another expression component is extracted, as described and illustrated earlier.

The web content management server 12 then determines in step 214 whether an equivalent XPath expression can be generated for the extracted expression component, also as described and illustrated earlier. In this iteration, the exemplary extracted expression component is ".red:nth-of-type (odd)". This exemplary expression component would require selecting all the elements of the DOM generated in step 202 having a class attribute containing "red" and being in an odd position in the set of all children of the element's parents having the same name as the element. In this example, the :nth-of-type pseudo class does not have an equivalent XPath expression. Accordingly, in this iteration, the web content management server 12 determines in step 214 that an equivalent XPath expression cannot be generated for the extracted expression component and the No branch is taken to step 220.

In step 220, the web content management server 12 transforms the expression component into a transformed expression including at least one XPath expression and at least one extension function. Optionally, the web content management server 12 also stores the transformed expression at least temporarily in the memory 22. The extension functions in this example are custom functions written in Java, optionally defined in a file stored in the memory 22, and associated with an XPath processor of the web content management server 12. The extension functions can be mapped to one or more psuedo classes in the memory 22 and selected for a particular transformation based on the mapping.

Optionally, the extension functions are prefixed by a namespace which facilitates locating of the extension functions by the XPath processor. Also optionally, the transformed expression can include a mathematical operation (e.g., in order to implement an "odd" parameter of the psuedo class of the expression component). An exemplary set of extension functions is described and illustrated in more detail later with reference to FIGS. 3-7.

In this example, the expression component can be transformed into a transformed expression including "//*[contains(concat(", @class, "), 'red')][expr:css-type-position(.) mod 2=1]". Accordingly, in this example, the XPath expression of the transformed expression includes "//*[contains (concat(", @class, "), 'red')]". The extension function of the transformed expression in this example is the "css-type-position( )" extension function, although other extension functions with different names can also be used.

The extension function in this example takes in an indication of an element of the DOM as a parameter (or "." which indicates all elements as used in this example), although other parameters can also be used. In this example, "expr:" is used as a namespace prefix, although any namespace prefix can be used. Additionally, a modulus operation and comparison is performed on the result of the execution of the extension function in this example, although other mathematical or logical operations can also be used.

In step 218, the web content management server 12 determines whether there are any more expression components in the CSS selector expression, as described and illustrated earlier. If the web content management server 12 determines there are no more expression components in this iteration, then the No branch is taken to step 222.

In step 222, the web content management server 12 generates a combined expression including at least all of the transformed expressions and generated equivalent XPath expressions optionally stored in the memory 22 in steps 216 and step 220. In this example, the expressions can be merged together using the XPath operators corresponding to the CSS descendants operators, for example, although other operators and methods of combining the expressions can also be used.

In step 224, the web content management server 12 applies the combined expression to the DOM, generated in step 202 and corresponding to the web page, to generate a result. The result can be a set of elements of the DOM that satisfy or correspond to the CSS selector expression encountered in step 210, although other types and numbers of results are also possible. Subsequent to applying the combined in expression to the DOM or, referring back to step 210, if the web content management server 12 determines during execution of the JavaScript code in step 208 that a CSS selector expression has not been encountered and the No branch is taken, the web content management server proceeds to step 226.

In step 226, the web content management server 12 determines whether execution of the retrieved JavaScript has completed. If the web content management server 12 proceeds to step 226 subsequent to applying the combined expression to the DOM in step 224, it is likely that execution of the JavaScript is not complete. Accordingly, in these examples, the No branch is taken back to step 208 and the web content management server 12 continues executing the JavaScript retrieved in step 206. Additionally, the result generated in step 224 can be used by the JavaScript in these examples such as to manipulate, filter, perform an operation on, or reduce the DOM elements indicated therein. During the continued execution of the JavaScript code, the web content management server 12 again proceeds to step 210 in a subsequent iteration, as described and illustrated earlier.

However, if the No branch is taken from step 210, execution of the JavaScript is likely complete and no CSS selector expressions were encountered, or no additional CSS selector expression subsequent to a prior iteration of steps 214-224 was encountered. Accordingly, in these examples, the Yes branch is taken from step 226 to step 228. In step 228, the web content management server 12 sends a response to the HTTP request received in step 206 to the requesting one of the client devices 14(1)-14(n). The contents of the HTTP response can be based on the execution of the JavaScript code, for example, including any CSS selector expressions embedded therein.

Referring to FIGS. 3-7, exemplary methods performed by an exemplary set of extension functions when executed during the application of the combined expression to the DOM in step 224 is illustrated. The extension functions can be executed by an XPath processor, which is optionally part of an extensible stylesheet language (XSL) processor, of the web content management server 12, for example, although other methods of executing the extension functions can also be used.

Figure 3:
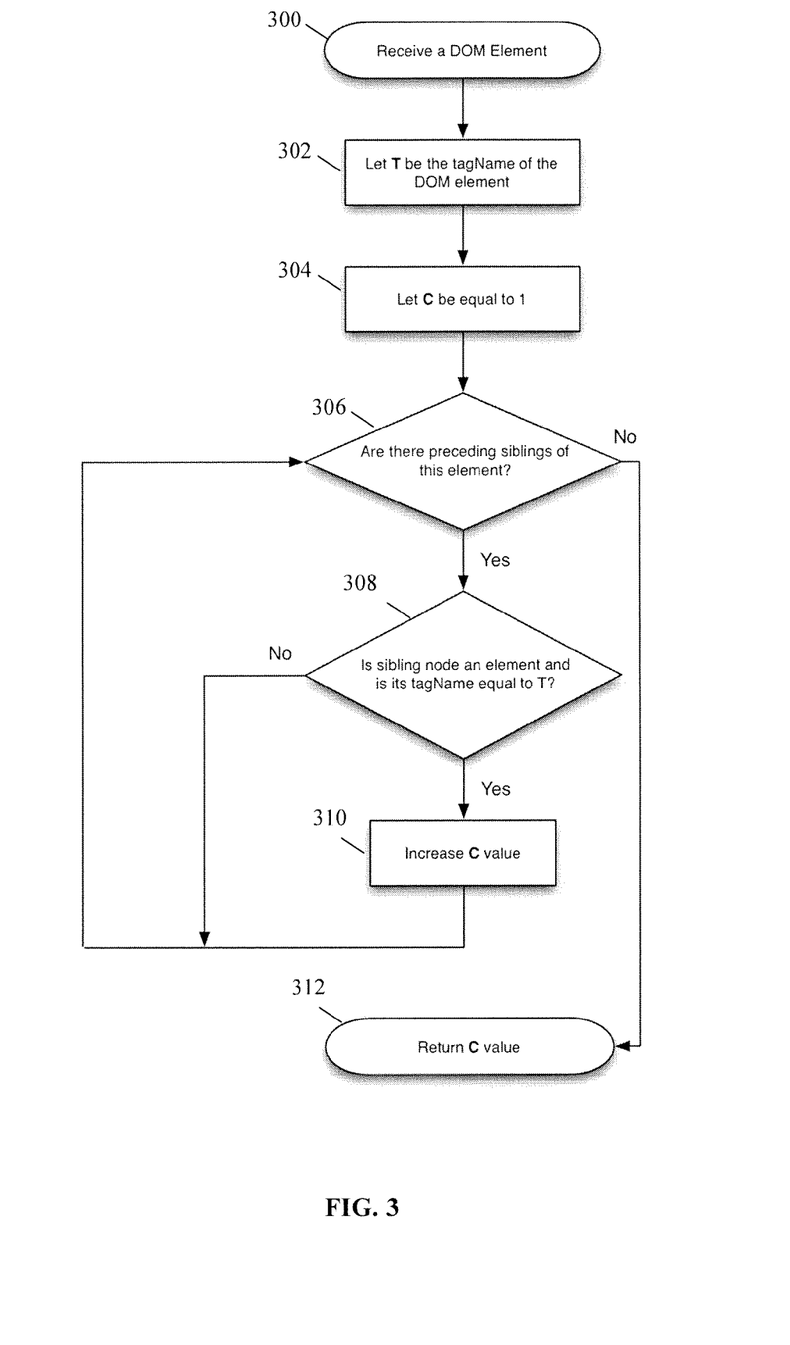
FIG. 3 is a flow chart of an exemplary method performed by an extension function for evaluating the :first-of-type, :last-of-type, :nth-of-type, and :nth-last-of-type pseudo classes.

Referring more specifically to FIG. 3, a flow chart of an exemplary method performed by an extension function for evaluating the :first-of-type, :last-of-type, :nth-of-type, and :nth-last-of-type pseudo classes is illustrated. In step 300, the web content management server 12 receives an indication of a DOM element, such as passed through a parameter of the extension function. In this example, the extension function can be the "css-type-position(element)" extension function identified earlier for evaluating the :nth-of-type pseudo class of the ".red:nth-of-type(odd)" expression component of the example described and illustrated earlier, although any other name can be used for the extension function.

In step 302, the web content management server 12 instantiates a variable T having a value of the tag name of the DOM element received in step 300. In step 304, the web content management server 12 instantiates a variable C having a value of 1. Other variables and variable names can also be used.

In step 306, the web content management server 12 determines whether there are any preceding siblings in the DOM of the DOM element received in step 300. If the web content management server 12 determines there are any preceding siblings in the DOM, then the Yes branch is taken to step 308. In step 308, the web content management server 12 determines whether one of the preceding siblings is an element and has a tag name equal to T. If the web content management server 12 determines that the preceding sibling is an element and has a tag name equal to T, then the Yes branch is taken to step 310. In step 310, the web content management server 12 increments the value of C. If the web content management server 12 determines that the preceding sibling is not an element or does not have a tag name equal to T, then the No branch is taken back to step 306.

In a subsequent iteration of step 306 in this example, the web content management server 12 again determines whether there are any additional preceding siblings of the element that have not yet been considered. If the web content management server 12 determines there is not any additional preceding siblings, then the No branch is taken to step 312. In step 312, the web content management server 12 returns the value of C. The returned value can be used to continue evaluating the combined expression applied to the DOM, for example. Accordingly, the extension function in this example returns a number of preceding sibling elements of the element of the DOM having the same tag name as the element plus one.

Figure 4:
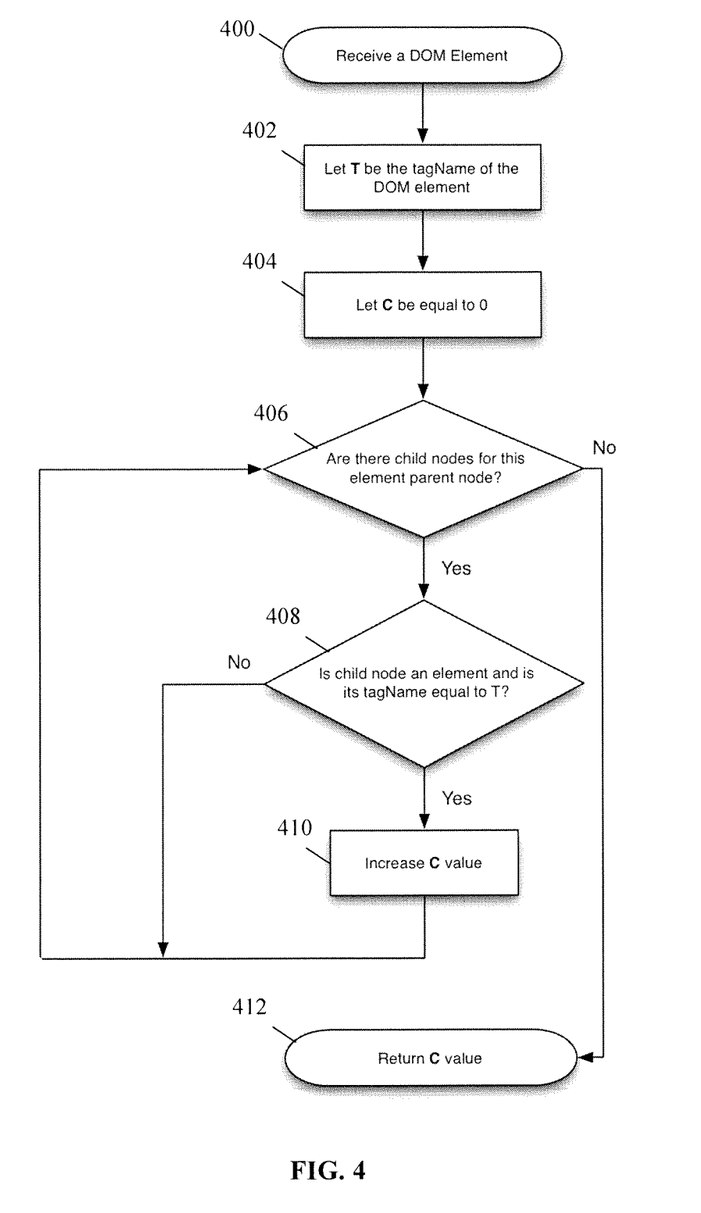
FIG. 4 is a flow chart of an exemplary method performed by an extension function for evaluating the :last-of-type, :only-of-type, and :nth-last-of-type pseudo classes.

Referring more specifically to FIG. 4, a flow chart of an exemplary method performed by an extension function for evaluating the :last-of-type, :only-of-type, and :nth-last-of-type pseudo classes is illustrated. In step 400, the web content management server 12 receives an indication of a DOM element, such as passed through a parameter of the extension function. In this example, the extension function can be a "css-type-total(element)" extension function, although any other name can be used for the extension function.

In step 402, the web content management server 12 instantiates a variable T having a value of the tag name of the DOM element received in step 400. In step 404, the web content management server 12 instantiates a variable C having a value of 0. Other variables and variable names can also be used.

In step 406, the web content management server 12 determines whether there are any children in the DOM of the parent of the DOM element received in step 400 or, alternatively, any siblings of the DOM element. If the web content management server 12 determines there are children of the parent of the DOM element, then the Yes branch is taken to step 408. In step 408, the web content management server 12 determines whether one of the children is an element and has a tag name equal to T. If the web content management server 12 determines that the child is an element and has a tag name equal to T, then the Yes branch is taken to step 410. In step 410, the web content management server 12 increments the value of C. If the web content management server 12 determines that the child is not an element or does not have a tag name equal to T, then the No branch is taken back to step 406.

In a subsequent iteration of step 406 in this example, the web content management server 12 again determines whether there are any additional children of the parent of the element that have not yet been considered. If the web content management server 12 determines there is not any additional children, then the No branch is taken to step 312. In step 312, the web content management server 12 returns the value of C. The returned value can be used to continue evaluating the combined expression applied to the DOM, for example. Accordingly, the extension function in this example returns a number of child elements of the parent of the element of the DOM having the tag name one of the element.

Figure 5:
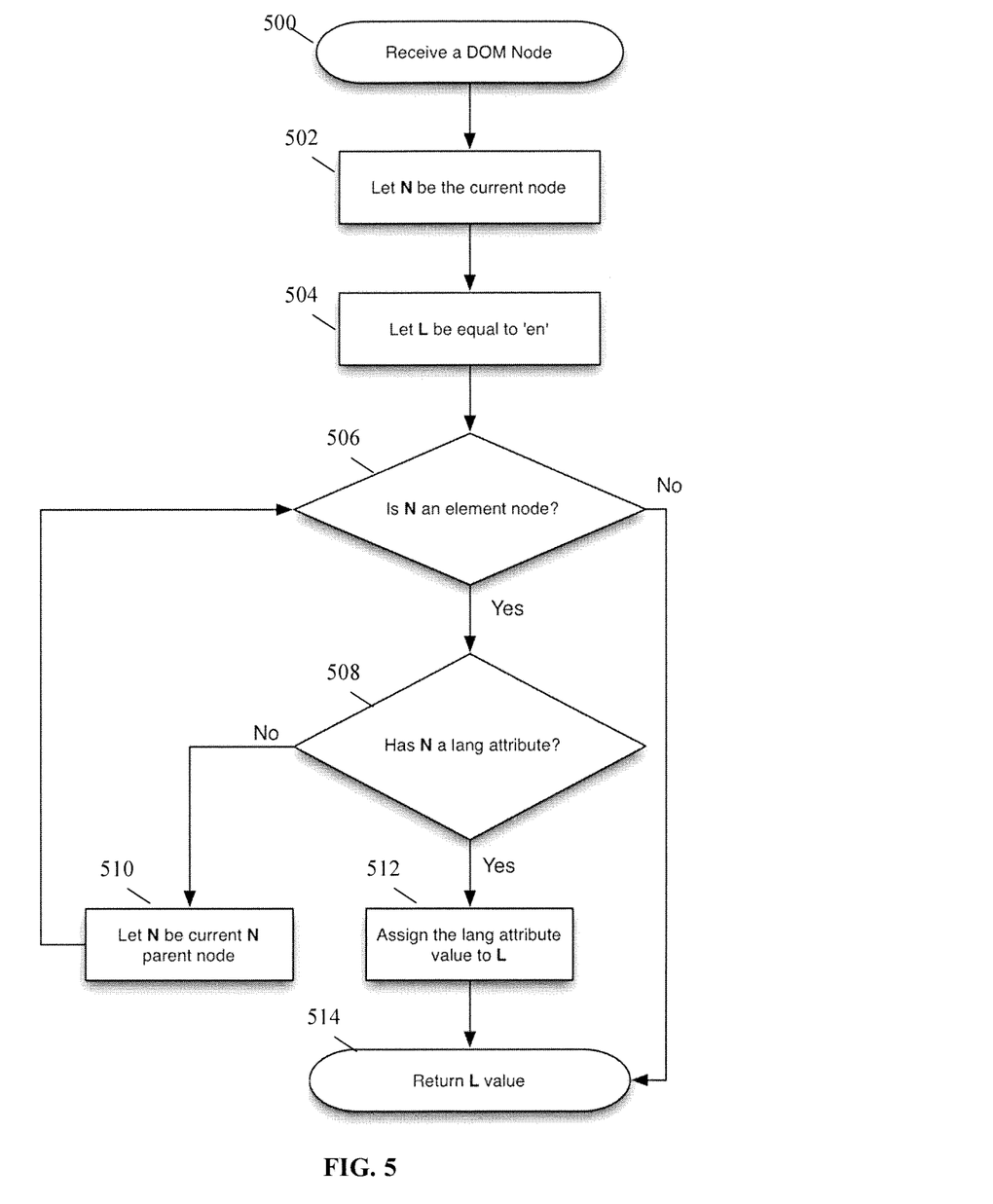
FIG. 5 is a flow chart of an exemplary method performed by an extension function for evaluating the :lang pseudo class.

Referring more specifically to FIG. 5, a flow chart of an exemplary method performed by an extension function for evaluating the :lang pseudo class is illustrated. In step 500, the web content management server 12 receives an indication of a DOM node, such as passed through a parameter of the extension function. In this example, the extension function can be a "lang(node)" extension function, although any other name can be used for the extension function.

In step 502, the web content management server 12 instantiates a variable N having a value indicating the node received in step 500. In step 504, the web content management server 12 instantiates a variable L having a value of 'en' or any other default indication of a language. Other variables and variable names can also be used.

In step 506, the web content management server 12 determines whether N indicates a node that is an element. If the web content management server 12 determines N indicates a node that is an element, then the Yes branch is taken to step 508. In step 508, the web content management server 12 determines whether the node indicated by N has a language attribute. If the web content management server 12 determines that the node indicated by N does not have a language attribute, then the No branch is taken to step 510.

In step 510, the web content management server 12 sets the value of N to indicate the parent of the node indicated by the current value of N. The web content management server 12 then proceeds back to step 506 and again determines whether N indicates a node that is an element. Referring back to step 508, if the web content management server 12 determines that the node indicated by N does have a language attribute, then the Yes branch is taken to step 512.

In step 512, the value of L is assigned the value of the language attribute of the node indicated by N. In step 514, the web content management server 12 returns the value of L. Referring back to step 506, if the web content management server 12 determines in a first or subsequent iteration that N indicates a node that is not an element, then the No branch is taken to step 514 and the default value of L is returned. The returned value can be used to continue evaluating the combined expression applied to the DOM, for example. Accordingly, the extension function in this example returns a value of a first identified language attribute based on a traversal of the element of the DOM and any ancestors of the element of the DOM.

Figure 6:
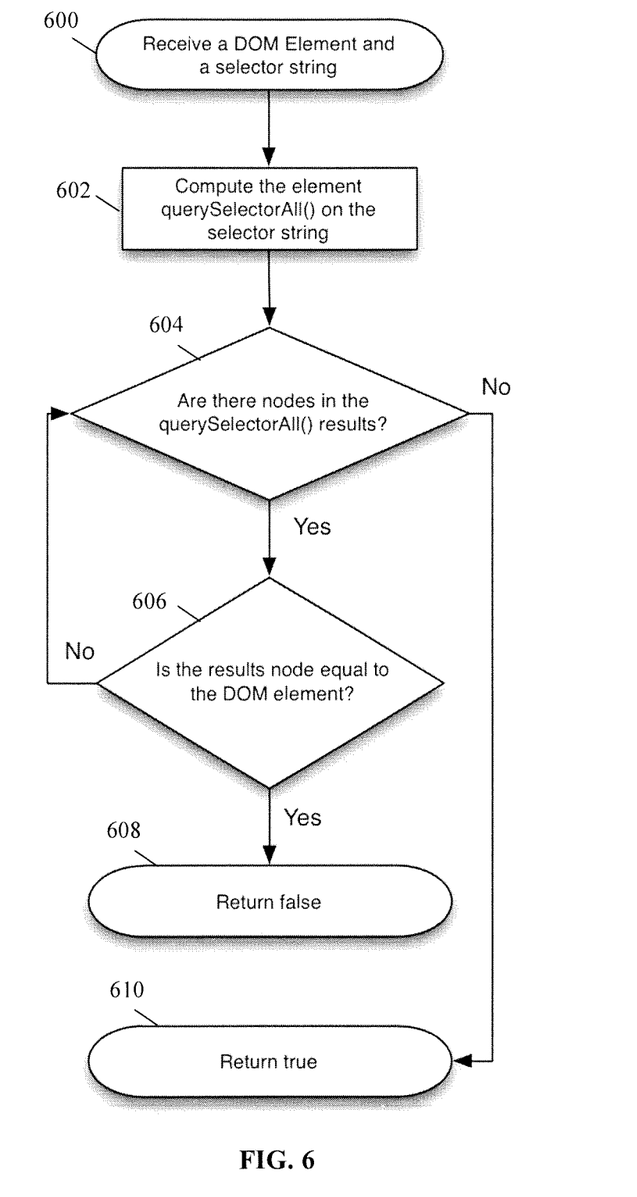
FIG. 6 is a flow chart of an exemplary method performed by an extension function for evaluating the :not pseudo class.

Referring more specifically to FIG. 6, a flow chart of an exemplary method performed by an extension function for evaluating the :not pseudo class is illustrated. In step 600, the web content management server 12 receives an indication of a DOM element and a string including a CSS selector expression, such as passed through a parameter of the extension function. In this example, the extension function can be a "filter-out(element, css-selector)" extension function, although any other name can be used for the extension function.

In step 602, the web content management server 12 applies the received CSS selector expression to the DOM to generate a result, such as described and illustrated earlier with reference to steps 210-224, for example, although other methods of evaluating the received CSS selector expression can also be used. In this example, the CSS selector expression includes a CSS selector function querySelectorAll( ) although other functions can also be included in the CSS selector expression of the string received in step 600.

In step 604, the web content management server 12 determines whether there are any nodes in the result generated by the application of the CSS selector expression in step 602. If the web content management server 12 determines there are node(s) in the result, then the Yes branch is taken to step 606. In step 606, the web content management server 12 determines whether one of the node(s) in the result is equal to the DOM element received in step 600. If the web content management server 12 determines that the one of the node(s) in the result is equal to the DOM element, then the Yes branch is taken to step 608. In step 608, the web content management server 12 returns a value of false.

Referring back to step 606, if the web content management server 12 determines that the one of the node(s) in the result is not equal to the DOM element, then the No branch is taken back to step 604. If the web content management server 12 determines in step 604 that the no nodes in the result of the evaluation of the CSS selector expression, or no additional nodes not previously considered, then the No branch is taken to step 610. In step 610, the web content management server 12 returns a value of true. Accordingly, the extension function in this example returns a true value when the element of the DOM received in step 600 is not included in a result obtained by applying the CSS selector expression received in step 600 and a false value when the element of the DOM is included in the result.

Figure 7:
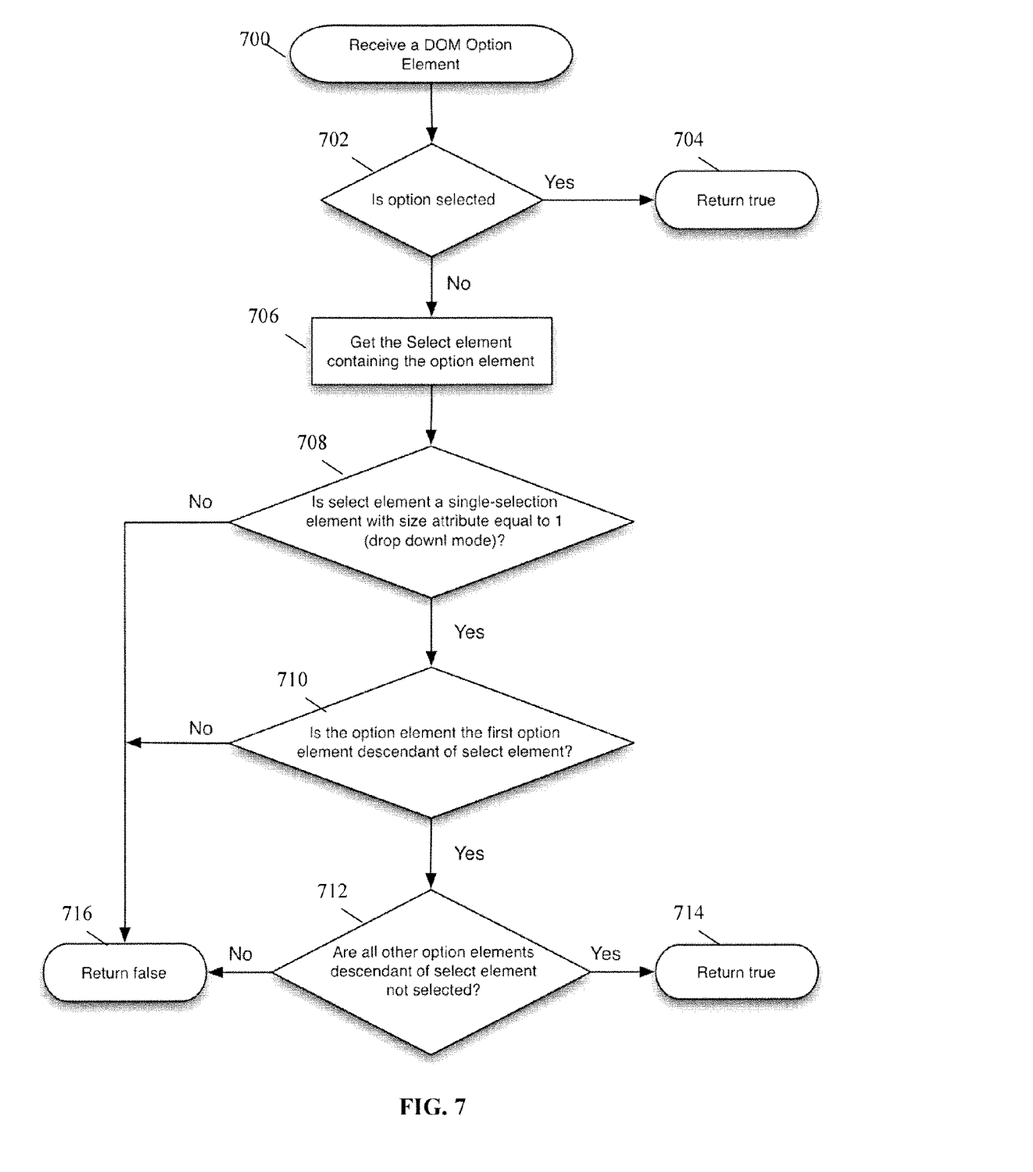
FIG. 7 is a flow chart of an exemplary method performed by an extension function for evaluating the :selected jQuery pseudo class.

Referring more specifically to FIG. 7, a flow chart of an exemplary method performed by an extension function for evaluating the :selected jQuery pseudo class is illustrated. In step 700, the web content management server 12 receives an indication of a DOM option element, such as passed through a parameter of the extension function. In this example, the extension function can be an "option-selected(option)" extension function, although any other name can be used for the extension function. The indication of the option element can represent an option in a dropdown list in an HTML form, for example, although the option can also refer to other types of elements.

In step 701, the web content management server 12 determines whether the option is explicitly selected. If the web content management server 12 determines that the option is explicitly selected, then the Yes branch is taken to step 704. In step 704, the web content management server returns a value of true. Referring back to step 702, if the web content management server 12 determines that the option is not explicitly selected, then the No branch is taken to step 706.

In step 706, the web content management server 12 obtains a select element from the DOM that contains the option element corresponding to the indication received in step 700. In step 708, the web content management server 12 determines whether the select element is a single selection element with size attribute equal to 1. If the web content management server 12 determines that the select element is a single selection element with size attribute equal to 1 then the Yes branch is taken to step 210.

In step 710, the web content management server 12 determines whether the option element corresponding to the indication received in step 700 is the first option element descendant of the select element. If the web content management server 12 determines that the option element is the first option element descendant of the select element, then the Yes branch is taken to step 712.

In step 712, the web content management server 12 determines whether all of the other option elements descendant from the select element are not selected. If the web content management server 12 determines that all of the other option elements descendant from the select element are not selected then the Yes branch is taken to step 714. In step 714, the web content management server 12 returns a value of true.

Referring back to steps 708, 710, and 712, if the web content management server determines that the select element is not a single selection element or does not have a size attribute equal to 1, the option element corresponding to the indication received in step 700 is not the first option element descendant of the select element, or any of the other option elements descendant from the select element are selected, respectively, then one of the respective No branches is taken to step 716. In step 716, the web content management server 12 returns a value of false. Accordingly, the extension function in this example returns a true value if the option element of the DOM is selected and a false value if the option element of the DOM is not selected. In this example, the option is considered selected if it is explicitly selected or if it is the first option of a select element that has no explicitly selected options and is not a multiple selections select element.

With this technology, web page scripts including JavaScript code can be emulated by a web content management server on behalf of client devices that may not otherwise be able to take advantage of such functionality. Advantageously, any CSS selector expressions embedded in the JavaScript can be translated to XPath expressions based on an equivalent XPath expression or, in the case of CSS selector expressions without equivalent XPath expressions, by using an extension function. Thereby, CSS selector expressions can be fully translatable to XPath expressions and implemented using a relatively efficient XPath processor without the significant additional code and associated complexity required to implement the CSS selector expressions of the selector API.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for extending a selector application programming interface (API), the method comprising:
   receiving, by a web content management server, a cascading style sheet (CSS) selector expression comprising a plurality of expression components;
   determining, by the web content management server, when an equivalent XML path language (XPath) expression can be generated for each of the expression components; and
   transforming, by the web content management server, each of the expression components for which the determining indicates that an equivalent XPath expression cannot be generated into a transformed expression comprising at least one XPath expression and an extension function.

2. The method of claim 1 further comprising generating, with the web content management server, the equivalent XPath expression for each of the plurality of expression components for which the determining indicates that an equivalent XPath expression can be generated.

3. The method of claim 2 further comprising:
   generating, by the web content management server, a combined expression comprising each of the transformed expression components and each of the equivalent XPath expressions; and
   applying, by the web content management server, the combined expression to a document object model (DOM) to generate a result.

4. The method of claim 3 wherein the extension function comprises JavaScript code and the applying further comprises executing the extension function in an emulated JavaScript environment.

5. The method of claim 3 wherein:
   at least one of the expression components for which the determining indicates that an equivalent XPath expression cannot be generated comprises a pseudo class comprising :first-of-type, :last-of-type, :nth-of-type, or :nth-last-of-type; and
   the extension function of the transformed expression for the at least one of the expression components is configured to receive an indication of an element of the DOM, the indication comprising a tag name of the element of the DOM, and return a number of one or more preceding sibling elements of the element of the DOM having the tag name.

6. The method of claim 3 wherein:
   at least one of the expression components for which the determining indicates that an equivalent XPath expression cannot be generated comprises a pseudo class comprising :last-of-type, :only-of-type, or :nth-last-of-type; and
   the extension function of the transformed expression for the at least one of the expression components is configured to receive an indication of an element of the DOM, the indication comprising a tag name of the element of the DOM and return a number of child elements of the parent of the element of the DOM having the tag name plus one.

7. The method of claim 3 wherein:
   at least one of the expression components for which the determining indicates that an equivalent XPath expression cannot be generated comprises a :lang pseudo class; and
   the extension function of the transformed expression for the at least one of the expression components is configured to receive an indication of an element of the DOM and return a value of a first identified language attribute based on a traversal of the element of the DOM and any ancestors of the element of the DOM.

8. The method of claim 3 wherein:
   at least one of the expression components for which the determining indicates that an equivalent XPath expression cannot be generated comprises a :not pseudo class; and
   the extension function of the transformed expression for the at least one of the expression components is configured to receive an indication of an element of the DOM and a second CSS selector expression and return a true value when the element of the DOM is not included in a second result obtained by applying the second CSS selector expression and a false value when the element of the DOM is included in the second result.

9. The method of claim 3 wherein:
   at least one of the expression components for which the determining indicates that an equivalent XPath expression cannot be generated comprises a :selected jQuery pseudo class; and the extension function of the transformed expression for the at least one of the expression components is configured to receive an option element of the DOM and return a true value if the option element of the DOM is selected and a false value if the option element of the DOM is not selected.

10. A non-transitory computer readable medium having stored thereon instructions for extending a selector application programming interface (API) comprising machine executable code which when executed by a processor, causes the processor to perform steps comprising:
receiving a cascading style sheet (CSS) selector expression comprising a plurality of expression components;
determining when an equivalent XML path language (XPath) expression can be generated for each of the expression components; and
transforming each of the expression components for which the determining indicates that an equivalent XPath expression cannot be generated into a transformed expression comprising at least one XPath expression and an extension function.

11. The non-transitory computer readable medium of claim 10 further having stored thereon instructions comprising machine executable code which when executed by the processor, causes the processor to perform steps further comprising generating the equivalent XPath expression for each of the plurality of expression components for which the determining indicates that an equivalent XPath expression can be generated.

12. The non-transitory computer readable medium of claim 11 further having stored thereon instructions comprising machine executable code which when executed by the processor, causes the processor to perform steps further comprising:
generating a combined expression comprising each of the transformed expressions and each of the equivalent XPath expressions; and
applying the combined expression to a document object model (DOM) to generate a result.

13. The non-transitory computer readable medium of claim 12 wherein the extension function comprises JavaScript code and the applying further comprises executing the extension function in an emulated JavaScript environment.

14. The non-transitory computer readable medium of claim 12 wherein:
at least one of the expression components for which the determining indicates that an equivalent XPath expression cannot be generated comprises a pseudo class selected from :first-of-type, :last-of-type, :nth-of-type, or :nth-last-of-type; and
the extension function of the transformed expression for the at least one of the expression components is configured to receive an indication of an element of the DOM, the indication comprising a tag name of the element of the DOM, and return a number of preceding sibling elements of the element of the DOM having the tag name.

15. The non-transitory computer readable medium of claim 12 wherein:
at least one of the expression components for which the determining indicates that an equivalent XPath expression cannot be generated comprises a pseudo class selected from :last-of-type, :only-of-type, or :nth-last-of-type; and
the extension function of the transformed expression for the at least one of the expression components is configured to receive an indication of an element of the DOM, the indication comprising a tag name of the element of the DOM and return a number of child elements of the parent of the element of the DOM having the tag name plus one.

16. The non-transitory computer readable medium of claim 12 wherein:
at least one of the expression components for which the determining indicates that an equivalent XPath expression cannot be generated comprises a :lslang pseudo class; and
the extension function of the transformed expression for the at least one of the expression components is configured to receive an indication of an element of the DOM and return a value of a first identified language attribute based on a traversal of the element of the DOM and any ancestors of the element of the DOM.

17. The non-transitory computer readable medium of claim 12 wherein:
at least one of the expression components for which the determining indicates that an equivalent XPath expression cannot be generated comprises a :not pseudo class; and
the extension function of the transformed expression for the at least one of the expression components is configured to receive an indication of an element of the DOM and a second CSS selector expression and return a true value when the element of the DOM is not included in a second result obtained by applying the second CSS selector expression and a false value when the element of the DOM is included in the second result.

18. The non-transitory computer readable medium of claim 12 wherein:
at least one of the expression components for which the determining indicates that an equivalent XPath expression cannot be generated comprises a :selected jQuery pseudo class; and
the extension function of the transformed expression for the at least one of the expression components is configured to receive an option element of the DOM and return a true value if the option element of the DOM is selected and a false value if the option element of the DOM is not selected.

19. A management server device, comprising:
a memory comprising programmed instructions stored in the memory and a hardware processor executing the programmed instructions stored in the memory to:
receive a cascading style sheet (CSS) selector expression comprising a plurality of expression components;
determine when an equivalent XML path language (XPath) expression can be generated for each of the expression components; and
transform each of the expression components for which the determining indicates that an equivalent XPath expression cannot be generated into a transformed expression comprising at least one XPath expression and an extension function.

20. The management server device of claim 19 wherein the hardware processor further executing the programmed instructions stored in the memory generating to generate the equivalent XPath expression for each of the plurality of expression components for which the determining indicates that an equivalent XPath expression can be generated.

21. The management server device of claim 20 wherein the hardware processor further executing the programmed instructions stored in the memory comprising to:

generate a combined expression comprising each of the transformed expressions and each of the equivalent XPath expressions; and apply the combined expression to a document object model (DOM) to generate a result.

22. The management server device of claim 21 wherein the extension function comprises JavaScript code and the hardware processor further executing the programmed instructions stored in the memory to execute the extension function in an emulated JavaScript environment.

23. The management server device of claim 21 wherein:
at least one of the expression components for which determining indicates that an equivalent XPath expression cannot be generated comprises a pseudo class selected from :first-of-type, :last-of-type, :nth-of-type, or :nth-last-of-type; and
the extension function of the transformed expression for the at least one of the expression components is configured to receive an indication of an element of the DOM, the indication comprising a tag name of the element of the DOM, and return a number of preceding sibling elements of the element of the DOM having the tag name.

24. The management server device of claim 21 wherein:
at least one of the expression components for which determining indicates that an equivalent XPath expression cannot be generated comprises a pseudo class selected from :last-of-type, :only-of-type, or :nth-last-of-type; and
the extension function of the transformed expression for the at least one of the expression components is configured to receive an indication of an element of the DOM, the indication comprising a tag name of the element of the DOM and return a number of child elements of the parent of the element of the DOM having the tag name plus one.

25. The management server device of claim 21 wherein:
at least one of the expression components for which determining indicates that an equivalent XPath expression cannot be generated comprises a :lang pseudo class; and
the extension function of the transformed expression for the at least one of the expression components is configured to receive an indication of an element of the DOM and return a value of a first identified language attribute based on a traversal of the element of the DOM and any ancestors of the element of the DOM.

26. The management server device of claim 21 wherein:
at least one of the expression components for which determining indicates that an equivalent XPath expression cannot be generated comprises a :not pseudo class; and
the extension function of the transformed expression for the at least one of the expression components is configured to receive an indication of an element of the DOM and a second CSS selector expression and return a true value when the element of the DOM is not included in a second result obtained by applying the second CSS selector expression and a false value when the element of the DOM is included in the second result.

27. The management server device of claim 21 wherein:
at least one of the expression components for which determining indicates that an equivalent XPath expression cannot be generated comprises a :selected jQuery pseudo class; and
the extension function of the transformed expression for the at least one of the expression components is configured to receive an option element of the DOM and return a true value if the option element of the DOM is selected and a false value if the option element of the DOM is not selected.

* * * * *